United States Patent Office 3,427,313
Patented Feb. 11, 1969

---

3,427,313
CARBOXAMIDOALKYL-1,3-BENZOXAZINES
Luigi Bernardi, Severina Coda, Lorenzo Pegrassi, and Giselbert Karl Suchowsky, Milan, Italy, assignors to Società Farmaceutici Italia, Milan, Italy, a corporation of Italy
No Drawing. Filed Dec. 19, 1966, Ser. No. 602,583
Claims priority, application Italy, Dec. 23, 1965, 28,507/65; Sept. 14, 1966, 21,075/66
U.S. Cl. 260—244        12 Claims
Int. Cl. C07d 87/08; A61k 27/00

ABSTRACT OF THE DISCLOSURE

The present invention relates to carboxamidoalkyl-1,3-benzoxazines. Also described is a process for their preparation. The new class of benzoxazines has the structure:

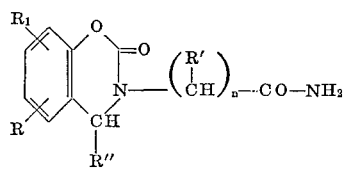

wherein R and $R_1$ may be the same or different and are selected from hydrogen, halogen, cyano, nitro or alkoxy having from 1 to 4 carbon atoms; R' and R" may be the same or different and are hydrogen, unsubstituted or phenyl substituted alkyl having from 1 to 4 carbon atoms; and $n$ is 1 or 2. The compounds show an interesting activity in preventing the depression from reserpine.

---

The present invention relates to carboxamidoalkyl-1,3-benzoxazines and a process for their preparation.
The new class of benzoxazines has the structure:

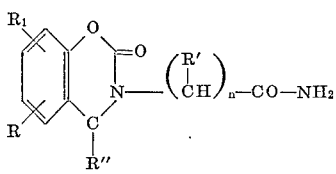

wherein R and $R_1$ may be the same or different and are selected from hydrogen, halogen, cyano or nitro, optionally substituted alkyl or alkoxy having from 1 to 4 carbon atoms; R' and R" may be the same or different and are hydrogen, unsubstituted or phenyl substituted alkyl having from 1 to 4 carbon atoms; and $n$ is 1 or 2.

The process of the invention for preparing the new compounds comprises cyclisizing a lower alkyl ester of o.hydroxyaryl-aminoalkyl-carboxylic acid (III) with a suitable condensing agent and converting the resulting ester group with ammonia into an amide group according to the reaction scheme:

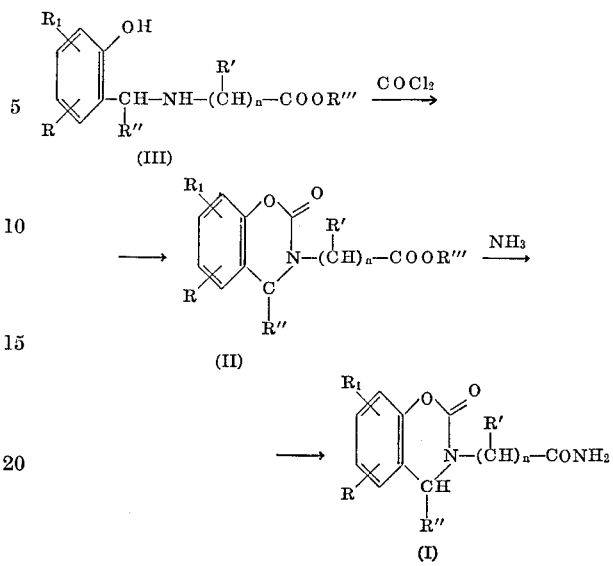

wherein R, $R_1$, R', R" and $n$ have the above defined meaning and R'" presents an alkyl radical having from 1 to 4 carbon atoms.

The alkyl ester III, the starting material of the compounds of the invention, may be prepared by reacting the lower alkyl ester of an aminoacid with an o.hydroxyaryl-aldehyde or -ketone and hydrogenating the resulting Schiff's base in the presence of a catalyst according to the reaction:

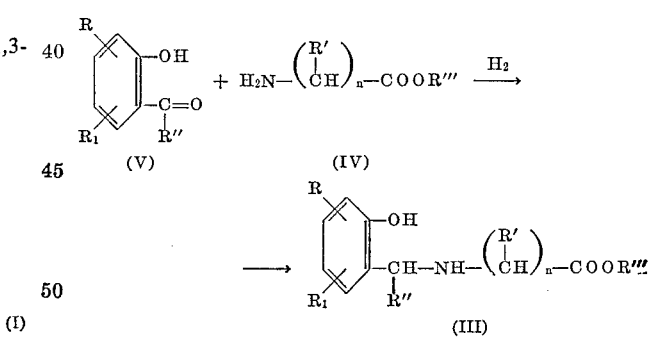

Substituting groups may be introduced in the benzene ring, according to the nature of the substituting group, before or after the hydrogenating reaction. The ester IV, dissolved in a polar solvent such as an aliphatic alcohol having from 1 to 4 carbon atoms, is treated with the o.hydroxyaryl-aldehyde or -ketone (V). The reaction mixture is hydrogenated in the presence of a suitable catalyst such as Raney nickel, palladium on charcoal or platinum oxide until hydrogen absorption is completed. The reaction mixture is filtered, the alcohol evaporated off, and made alkaline with ammonia. The alkyl ester (III) is extracted with an organic solvent such as ethyl acetate.

According to the invention, this ester (III) dissolved in a solvent such as tetrahydrofuran, benzene or ether, is cyclisized by phosgene, preferably in the presence of an acid acceptor such as pyridine, to give the 3-carboalkoxyalkyl-1,3-benzoxazine-2-one (II) which after purification and crystallization is dissolved in a suitable solvent and reacted with ammonia to give the corresponding 3-carboxamide.

The compounds of the invention are solid crystallines stable to the light and heat. They show an interesting activity in preventing the depression from reserpine at doses which do not cause any untoward side effects of the parameters considered. The study of the examined products shows a slight calming action. The first symptoms of toxicity are observed at about 1000–12000 mg./kg. by oral route. At the tested doses, the compounds are without anticonvulsive and antitremorin activity. At higher doses they potentiate barbituric hypnosis. The following table illustrates the antidepressing activity of 4H-3-carboxamidomethyl-1,3-benzoxazine-2-one to reserpine in comparison with the antidepressing activity of imipramine.

| Compound | Doses, mg./kg. | Administration route | Ptosis | Temperature in C.° |
| --- | --- | --- | --- | --- |
| Controls | | | 0 | 38.7 |
| Reserpine (R) | 3.0 | Intraperitoneally | 40 | 32.3 |
| Imipramine+R | 50.0 | do | 10 | 37.8 |
| 4H-3-carboxamido-methyl-1,3-benzoxazine-2-one+R. | 50.0 | do | 3 | 38.7 |

From the above data, it is seen that 4H-3-carboxamidomethyl-1,3-benzoxazine-2-one is at least three times more active than imipramine. The therapeutic index is clearly favorable to the former compound. Furthermore, the toxicity is clearly less than that of imipramine since for the latter compound, the first toxic symptoms appear at doses of 75 mg./kg. intraperitoneally, while for 4H-3-carboxamidomethyl-1,3-benzoxazine-2-one they appear at doses of about 500 mg./kg. intraperitoneally. The above tests were performed on mice. At least 10 animals were used for each dosage.

The following examples illustrate, without limiting, the invention.

Example 1.—4H-3-carboxamidomethyl-1,3-benzoxazine-2-one 37.9 grams of ethyl glycinate hydrochloride were dissolved in 400 cc. of ethanol and 33.5 g. of salicylic aldehyde were added. It is refluxed for half an hour and cooled. 38 cc. of triethylamine and 25 g. of Raney nickel are then added whereafter hydrogenation is carried out at room temperature and under atmospheric pressure. After hydrogen adsorption was complete, the mixture was filtered and the alcohol evaporated off. The residue was taken up with acidified water, extracted with ether to eliminate part of the byproducts, consisting mainly of o.cresol, then made alkaline with ammonia and extracted with ethyl acetate. The solvent was removed in vacuo and the residue crystallized from ether/petroleum ether. 36.7 g. of o.hydroxybenzyl-aminoacetic acid ethyl ester melting at 47° C. are obtained.

20 grams of this compound were dissolved in 100 cc. of tetrahydrofuran and 100 cc. of a 30% solution of phosgene in tetrahydrofuran solution were added. After one night at room temperature, the reaction mixture was dried, taken up with 150 cc. of anhydrous pyridine and allowed to stand overnight. The pyridine was then removed in vacuo and the residue dissolved in benzol was washed several times with water and chromatographed over 250 g. of alumina. Elution with benzene/petroleum ether yielded 16 g. of 4H-3-carboethoxymethyl-1,3-benzoxazine-2-one, melting at 90–91° C.

5 grams of this last compound were dissolved in 120 cc. of absolute ethanol and saturated with NH$_3$ at 0° C. It was allowed to stand overnight whereafter 1.5 g. of 4H-3-carboxamidomethyl-1,3-benzoxazine-2-one, melting at 205° C., were obtained. By evaporation from the mother liquors further quantities of the same product were obtained.

Example 2.—4H-3-carboxamidomethyl-8-methoxy-1,3-benzoxazine-2-one

Operation was carried out in the same manner as in Example 1, with the difference that 2-hydroxy-3-methoxy-benzaldehyde was reacted with ethyl glycinate hydrochloride and the mixture was hydrogenated in the presence of palladium on charcoal. The yellow oily product so obtained, which is 2-hydroxy-3-methoxy-benzylamino-acetic acid ethyl ester, was then reacted with phosgene to give 4H-3-carboethoxymethyl-8-methoxy-1,3-benzoxazine - 2-one, melting at 104–105° C. This compound was then treated with ammonia to yield 4H-3-carboxamidomethyl-8-methoxy-1,3-benzoxazine-2-one, melting at 218–220° C.

Example 3.—4H-3-carboxamidomethyl-6-chloro-1,3-benzoxazine-2-one

Operation is carried out in the same manner as in Example 1 with the difference that the starting material was 2-hydroxy-5-chloro-benzaldehyde. The end product consisted of 4H-3-carboxamidomethyl-6-chloro-1,3-benzoxazine-2-one.

Example 4.—4H-3-($\beta$-carboxamidoethyl)-1,3-benzoxazine-2-one

Operation was carried out in the same manner as in Example 1 with the difference that the salicyclic aldehyde was added to $\beta$-alanine ethyl ester hydrochloride dissolved in ethyl alcohol. After hydrogenation with palladium on charcoal, a yellow oily product consisting of the o.hydroxy-benzylamino-propionic acid ethyl ester was obtained. This product was reacted with phosgene to give 4H-3-carboethoxyethyl-1,3-benzoxazine-2-one melting at 42° C., which by treatment with ammonia was converted into 4H-3-($\beta$-carboxamidoethyl)-1,3-benzoxazine-2-one, melting at 166–167° C. after crystallization from acetone.

Example 5.—4-methyl-3-(carboxamidomethyl)-1,3-benzoxazine-2-one

Operation is carried out in the same manner as in Example 1 with the difference that the o.hydroxyacetophenone was added to ethylglycinate hydrochloride and hydrogenated under 50 atmosphere pressure at a temperature of 65° C. using platinum oxide as catalyst. The ethyl ester, o.hydroxy-$\alpha$-methyl-benzylamino acetic acid, was separated as a yellow oil, then treated with phosgene to give 4-methyl-3-carboethoxymethyl - 1,3-benzoxazine-2-one, which is a practically colorless oil. By treatment with ammonia this compound was converted into 4-methyl-3-(carboxamidomethyl)-1,3-benzoxazine-2-one melting at 143–144° C. after crystallization from water.

Example 6.—4-methyl-3-($\alpha$-carboxamidoethyl)-1,3-benzoxazine-2-one

Operation is carried out in the same manner as in Example 1 with the difference that o.hydroxyacetophenone was added to $\alpha$-alanine ethyl ester hydrochloride dissolved in ethanol. A product consisting a 4-methyl-3-($\alpha$-carboxamidoethyl)-1,3-benzoxazine-2-one was obtained.

Example 7.—4H-3-($\alpha$-carboxamidoamyl)-1,3-benzoxazine-2-one

Operation is carried out in the same manner as in Example 1 with the difference that the salicylic aldehyde was added to the nor.leucine methyl ester hydrochloride to give, after hydrogenation, an oily product consisting of o.hydroxybenzyl-(α-carbomethoxy-amyl)-amine having the boiling point at 137–138° C. (0.3 mm. Hg). This substance when treated with phosgene gave 4H-3-(α-carbomethoxy-amyl)-1,3-benzoxazine-2-one as a light yellow oil and then by treatment with ammonia, white crystals of 4H-3-(α-carboxamidoamyl)-1,3-benzoxazine-2-one melting at 128–130° C.

Example 8.—4H-3-(carboxamidomethyl-6-methoxy)-1,3-benzoxazine-2-one

Operation is carried out in the same manner as in Example 1 with the difference that 2-hydroxy-5-methoxy-benzaldehyde was reacted with ethyl glycinate hydrochloride. After hydrogenation, the yellow oily product consisting of 2-hydroxy-5-methoxy-benzylamino acetic acid ethyl ester was reacted with phosgene to give as a white crystalline substance, 4H-3-(carboethoxymethyl-6-methoxy)-1,3-benzoxazine-2-one, melting at 135–136° C. By treatment with ammonia 4H-3-(carboxamidomethyl-6-methoxy)-1,3-benzoxazine-2-one melting at 194–195° C. was then obtained.

Example 9.—4H-3-(L-α-carboxamido-β-phenylethyl)-1,3-benzoxazine-2-one 4.1 grams of L-α-amino-β-phenylpropionic acid methyl ester hydrochloride were reacted with 2.35 g. of salicylic aldehyde in 20 cc. of absolute ethanol. It was refluxed for about one and a half hours, then cooled, and 1.9 cc. of triethylamine and 5 g. of Raney nickel were added. Hydrogenation is carried out at room temperature and under atmospheric pressure. Upon cessation of hydrogen adsorption the mixture was filtered, the alcohol removed, taken up with water acidified with hydrochloric acid, extracted with ether, then made alkaline with ammonia and then extracted with ethyl acetate. The solvent was evaporated in vacuo yielding 4.5 g. of an oily product, which corresponds to (L - α - carbomethoxy - β - phenylethyl)-o.hydroxybenzylamine. To this product dissolved in 40 cc. of tetrahydrofuran, 20 cc. of a 30% solution of phosgene in tetrahydrofuran were added. After one night at room temperature, this reaction mixture was dried, taken up with 40 cc. of anhydrous pyridine and allowed to stand overnight. The pyridine was removed in vacuo, the residue dissolved in a small quantity of benzol was washed several times with water and chromatographed over alumina. Elution with benzene/petroleum ether yielded 2.3 g. of 4H-3-(L-α-carbomethoxy-β-phenylethyl)-1,3-benzoxazine-2-one, a white crystalline substance melting at 99° C.

2.3 grams of this compound were dissolved in 50 cc. of absolute ethyl alcohol and reacted with anhydrous ammonia at 0° C. It is allowed to stand overnight to yield 1.6 g. of 4H-3-(L-α-carboxamido-β-phenylethyl)-1,3-benzoxazine-2-one, melting at 165–168° C.

Example 10.—4H-3-(carboxamidomethyl-6,8-dibromo)-1,3-benzoxazine-2-one 6 grams of o.hydroxybenzyl-aminoacetic acid ethyl ester obtained as described in Example 1, were dissolved in 50 cc. of glacial acetic acid and a solution of 3 cc. of bromine in acetic acid was added. The solution was neutralized with dilute caustic soda to yield 2-hydroxy-3,5-dibromobenzylamino ethyl acetate. After crystallization from ethyl alcohol, 6.1 g. of the compound melting at 95–97° C., were obtained. 6 grams of this compound were cyclisized with phosgene as described in Example 1. After crystallization from chloroform/petroleum ether, 4.9 g. of 4H-3-(carboethoxymethyl-6,8-dibromo)-1,3-benzoxazine-2-one, melting at 137–140° C., were obtained. Treatment of the latter with ammonia gave 3.8 g. of 4H-3-(carboxamidomethyl-6,8-dibromo)-1,3-benzoxazine - 2-one, which after crystallization from ethyl alcohol, melts at 245–249° C.

Example 11.—4H-3-carboxamidomethyl-6,8-dinitro-1,3-benzoxazine-2-one o.Hydroxy-benzylaminoacetic acid ethyl ester, prepared as described in Example 1, was nitrated with nitric acid/sulphuric acid to give 2-hydroxy-3,5-dinitrobenzyl-aminoacetic acid ethyl ester which was reacted with phosgene and then with ammonia to give 4H-3-carboxamidomethyl-6,8-dinitro-1,3-benzoxazine-2-one, which after crystallization from aqueous acetone, melts at 195–197° C.

We claim:
1. A compound of the structure

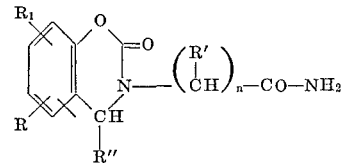

wherein

R and $R_1$ may be the same or different and are each selected from the group consisting of hydrogen, halogen, cyano, nitro, and alkoxy of from 1 to 4 carbon atoms;

R' is selected from the group consisting of hydrogen, alkyl of from 1 to 4 carbon atoms and alkyl of from 1 to 4 carbon atoms substituted with phenyl;

R" is selected from the group consisting of hydrogen and alkyl of from 1 to 4 carbon atoms; and $n$ is 1 or 2.

2. The species of claim 1 which is 4H-3-carboxamidomethyl-1,3-benzoxazine-2-one.

3. The species of claim 1 which is 4H-3-(carboxamidomethyl-8-methoxy)-1,3-benzoxazine-2-one.

4. The species of claim 1 which is 4H-3-(carboxamidomethyl-6-chloro)-1,3-benzoxazine-2-one.

5. The sepcies of claim 1 which is 4H-3-(β-carboxamidoethyl)-1,3-benzoxazine-2-one.

6. The species of claim 1 which is 4-methyl-3-(carboxamidomethyl)-1,3-benzoxazine-2-one.

7. The species of claim 1 which is 4-methyl-3-(α-carboxamidoethyl)-1,3-benzoazine-2-one.

8. The species of claim 1 which is 4H-3-(α-carboxamidoamyl)-1,3-benzoxazine-2-one.

9. The species of claim 1 which is 4H-3-(carboxamidomethyl-6-methoxy)-1,3-benzoxazine-2-one.

10. The species of claim 1 which is 4H-3-(L-α-carboxamido-β-phenylethyl)-1,3-benzoxazine-2-one.

11. The species of claim 1 which is 4H-3-(carboxamidomethyl-6,8-dibromo)-1,3-benzoxazine-2-one.

12. The species of claim 1 which is 4H-3-(carboxamidomethyl-6,8-dinitro)-1,3-benzoxazine-2-one.

References Cited

UNITED STATES PATENTS 3,280,120  10/1966  Petracek _____ 260—244

FOREIGN PATENTS 2,933  11/1964  France
1,015,406  12/1965  Great Britain

OTHER REFERENCES

Noller: Chemistry of Organic Compounds, 2nd ed., pages 244–5, Philadelphia, Saunders, 1958 QD253.N65.

Nippon Shinyaku, Chem. Abst. vol. 61, column 3120 (1964). QD1.A51.

HENRY R. JILES, *Primary Examiner.*

NATALIE TROUSOF, *Assistant Examiner.*

U.S. Cl. X.R.

260—471, 590, 592, 600, 999